(12) United States Patent
Tomita

(10) Patent No.: US 11,859,702 B2
(45) Date of Patent: Jan. 2, 2024

(54) FLOW CHANNEL STRUCTURE AND LOCK-UP DEVICE

(71) Applicant: EXEDY Corporation, Neyagawa (JP)

(72) Inventor: Yusuke Tomita, Neyagawa (JP)

(73) Assignee: Exedy Corporation, Neyagawa (JP)

( * ) Notice: Subject to any disclaimer, the term of this patent is extended or adjusted under 35 U.S.C. 154(b) by 142 days.

(21) Appl. No.: 17/888,684

(22) Filed: Aug. 16, 2022

(65) Prior Publication Data

US 2023/0081298 A1    Mar. 16, 2023

(30) Foreign Application Priority Data

Sep. 16, 2021   (JP) .................................. 2021-151445

(51) Int. Cl.
  *F16H 45/02*    (2006.01)
  *F16H 61/14*    (2006.01)

(52) U.S. Cl.
  CPC ............. *F16H 45/02* (2013.01); *F16H 61/14* (2013.01); *F16H 2045/0215* (2013.01); *F16H 2045/0221* (2013.01)

(58) Field of Classification Search
  CPC .. F16H 2045/0215; F16H 45/02; F16H 61/14; F16H 2045/0221
  See application file for complete search history.

(56) References Cited

U.S. PATENT DOCUMENTS 6,179,106 B1 *   1/2001   Masuda ................... F16H 45/02
                                              464/64.1
2020/0292029 A1 *  9/2020   Tomita ................ F16F 15/1407

FOREIGN PATENT DOCUMENTS

DE    102017104632 A1 *  9/2017  ............. F16D 23/02
JP        6654072 B2      2/2020

* cited by examiner

*Primary Examiner* — Abiy Teka
(74) *Attorney, Agent, or Firm* — United IP Counselors, LLC

(57) ABSTRACT

A flow channel structure forms a first flow channel which makes a first fluid chamber and a second fluid chamber communicate with each other therethrough. The flow channel structure includes first to third plates. The first plate includes a first through hole penetrating the first plate in a thickness direction to open to the first fluid chamber. The second plate includes a second through hole penetrating the second plate in the thickness direction to open to the second fluid chamber. The third plate includes a first connecting through hole penetrating the third plate in the thickness direction. The first connecting through hole is larger in flow channel area than each of the first and second through holes. The first and second through holes are disposed in different positions from each other as seen in the thickness direction. The first connecting through hole communicates with the first and second through holes.

11 Claims, 8 Drawing Sheets

FLOW CHANNEL STRUCTURE AND LOCK-UP DEVICE

CROSS-REFERENCE TO RELATED APPLICATIONS

This application claims priority to Japanese Patent Application No. 2021-151445 filed Sep. 16, 2021. The entire contents of that application are incorporated by reference herein in their entirety.

TECHNICAL FIELD

The present invention relates to a flow channel structure and a lock-up device.

BACKGROUND ART

There has been known a flow channel structure including a flow channel for supplying a fluid (e.g., hydraulic oil) from a first fluid chamber to a second fluid chamber. For example, Publication of Japan Patent No. 6654072 discloses a torque converter including a lock-up device for directly transmitting a torque from a s front cover to a turbine. The lock-up device includes a piston and a sleeve (flow channel structure). The piston is enabled to be engaged by friction with the front cover. The sleeve is provided with a flow channel for flow of hydraulic oil for moving the piston.

The hydraulic oil is supplied from the first fluid chamber to the second fluid chamber through the flow channel provided in the sleeve. Besides, when the hydraulic oil in the second fluid chamber is increased in pressure, the piston is axially moved, whereby a clutch part is turned to a torque transmission state. Here, the first and second fluid chambers are different in radial position; hence, the flow channel is provided to obliquely extend in the sleeve so as to make the first and second fluid chambers communicate with each other therethrough.

The flow channel structure described above has a block shape and is formed by forging of metal material such as iron and steel. Besides, it is required to form the flow channel to obliquely extend in the block-shaped flow channel structure. Because of this, the well-known flow channel structure has had a drawback of high manufacturing cost.

In view of the above, it is an object of the present invention to provide a flow channel structure manufacturable at low cost.

BRIEF SUMMARY

A flow channel structure according to a first aspect of the present invention forms a first flow channel for making a first fluid chamber and a second fluid chamber communicate with each other therethrough. The flow channel structure includes a first plate, a second plate, and a third plate. The first plate includes a first through hole. The first through hole penetrates the first plate in a thickness direction so as to open to the first fluid chamber. The second plate includes a second through hole. The second through hole penetrates the second plate in the thickness direction so as to open to the second fluid chamber. The third plate is disposed between the first and second plates. The third plate includes a first connecting through hole. The first connecting through hole is larger in flow channel area than each of the first and second through holes. The first connecting through hole penetrates the third plate in the thickness direction. The first and second through holes are disposed in different positions from each other as seen in the thickness direction. The first connecting through hole communicates with the first and second through holes.

According to this configuration, the first flow channel for making the first and second fluid chambers communicate with each other therethrough can be formed by combination of the first to third plates that include the through holes, respectively. In other words, the following is not done in manufacturing the flow channel structure according to the configuration described above: forging metal material such as iron and steel into a block shape and/or forming an obliquely extending flow channel. Because of this, the flow channel structure can be manufactured at low cost. It should be noted that the term "fluid chamber" means a space in which a fluid is accommodated and is conceptualized as encompassing a plumbing pipe as well.

Preferably, the flow channel structure further includes a first seal member. The first seal member is disposed along an inner wall surface defining the first connecting through hole.

Preferably, the flow channel structure forms a second flow channel for making a third fluid chamber and a fourth fluid chamber communicate with each other therethrough. The first plate includes a third through hole. The third through hole penetrates the first plate in the thickness direction so as to open to the third fluid chamber. The second plate includes a fourth through hole. The fourth through hole penetrates the second plate in the thickness direction so as to open to the fourth fluid chamber. The third plate includes a second connecting through hole. The second connecting through hole penetrates the third plate in the thickness direction. The third and fourth through holes are disposed in different positions from each other as seen in the thickness direction. The second connecting through hole is larger in flow channel area than each of the third and fourth through holes. The second connecting through hole communicates with the third and fourth through holes.

Preferably, the flow channel structure further includes a second seal member. The second seal member is disposed along an inner wall surface defining the second connecting through hole.

Preferably, the first, second, and third plates are disposed to be unitarily rotated with each other and each of the first, second, and third plates has an annular shape.

Preferably, the first through hole is disposed radially inside the second through hole.

Preferably, the third through hole is disposed radially outside the fourth through hole.

Preferably, the second plate includes a fifth through hole. The fifth through hole penetrates the second plate in the thickness direction so as to open to a fifth fluid chamber. The first connecting through hole communicates with the fifth through hole. According to this configuration, the fluid flowing from the first fluid chamber can be distributed to the second and fifth fluid chambers.

A lock-up device according to a second aspect of the present invention relates to a lock-up device of a torque converter for transmitting a torque inputted thereto from a front cover to a transmission-side member through a turbine hub. The lock-up device includes a clutch part, the flow channel structure configured as any of the above, a piston, a chamber plate, the first fluid chamber, and the second fluid chamber. The clutch part is disposed between the front cover and the turbine. The flow channel structure is fixed to the front cover. The piston is disposed to be axially movable on an outer peripheral surface of the flow channel structure. The piston is configured to turn the clutch part to a torque transmission state. The chamber plate is fixed to the flow channel structure. The chamber plate is disposed between the piston and the turbine. The first fluid chamber is defined by the flow channel structure, the front cover, and the turbine hub. The first fluid chamber communicates with the first through hole. The second fluid chamber is defined by the piston, the chamber plate, and the flow channel structure. The second fluid chamber communicates with the second through hole.

A lock-up device according to a third aspect of the present invention relates to a lock-up device of a torque converter for transmitting a torque inputted thereto from a front cover to a transmission-side member through a turbine hub. The lock-up device includes a clutch part, the flow channel structure configured as any of the above, a piston, a chamber plate, the first fluid chamber, the second fluid chamber, the third fluid chamber, and the fourth fluid chamber. The clutch part is disposed between the front cover and the turbine. The flow channel structure is fixed to the front cover. The piston is disposed to be axially movable on an outer peripheral surface of the flow channel structure. The piston is configured to turn the clutch part to a torque transmission state. The chamber plate is fixed to the flow channel structure. The chamber plate is disposed between the piston and the turbine. The first fluid chamber is defined by the flow channel structure, the front cover, and the turbine hub. The first fluid chamber communicates with the first through hole. The second fluid chamber is defined by the piston, the chamber plate, and the flow channel structure. The second fluid chamber communicates with the second through hole. The third fluid chamber is defined by the flow channel structure, the front cover, and the piston. The third fluid chamber communicates with the third through hole. The fourth fluid chamber is defined by the turbine hub, the flow channel structure, and the chamber plate. The fourth fluid chamber communicates with the fourth through hole.

Overall, according to the present invention, the flow channel structure is manufacturable at low cost.

DETAILED DESCRIPTION

Figure 1:
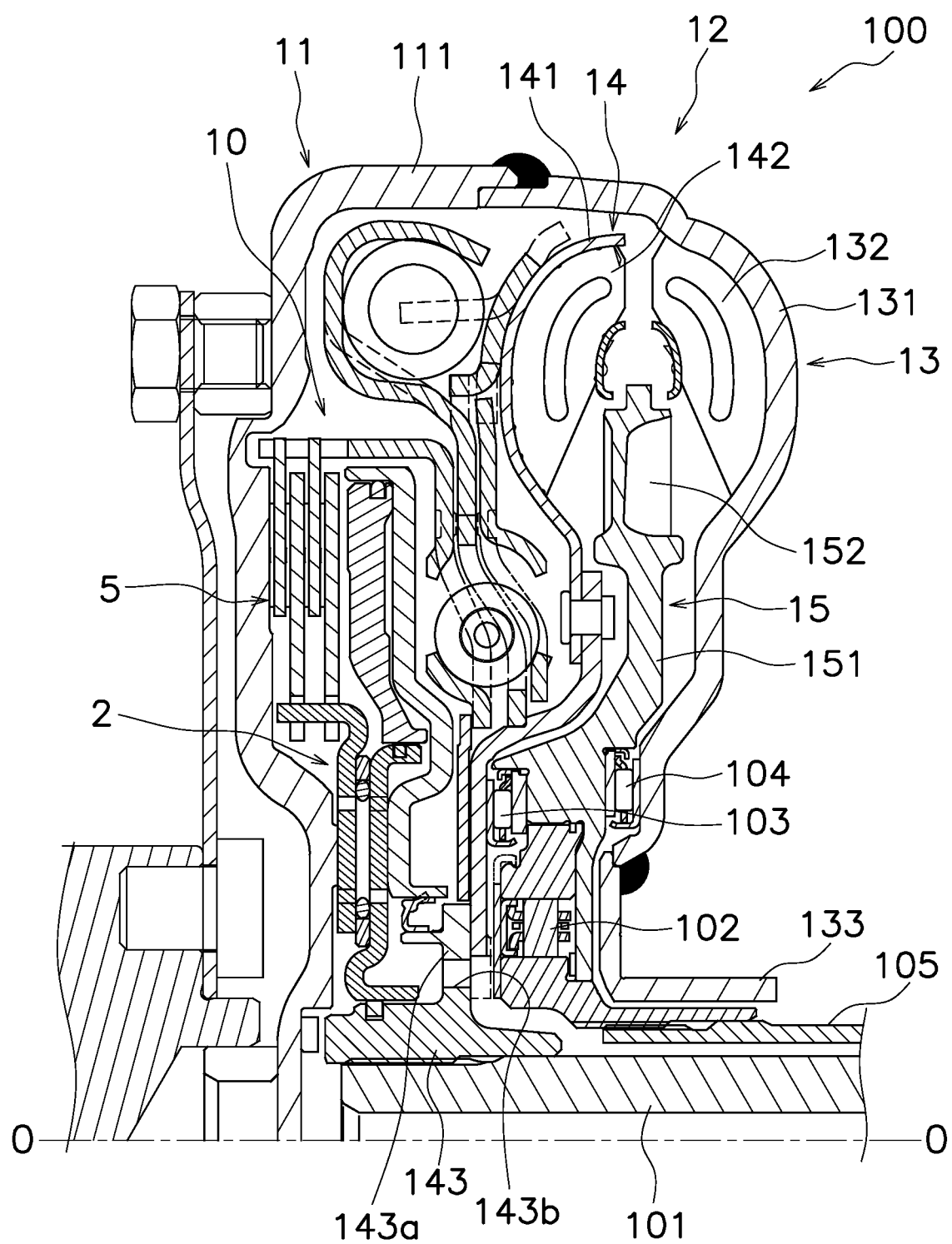
FIG. 1 is a cross-sectional view of a torque converter.

FIG. 1 is a partial cross-sectional view of a torque converter including a lock-up device according to the present preferred embodiment. In FIG. 1, an engine (not shown in the drawing) is disposed on the left side, whereas a transmission (not shown in the drawing) is disposed on the right side. It should be noted that line O-O depicted in FIG. 1 indicates a common rotational axis for the torque converter, the lock-up device, and a flow channel structure. In the following explanation, the term "axial direction" refers to an extending direction of the rotational axis O. On the other hand, the term "circumferential direction" refers to a circumferential direction of an imaginary circle about the rotational axis O, whereas the term "radial direction" refers to a radial direction of the imaginary circle about the rotational axis O. Yet on the other hand, the term "thickness direction" means a thickness direction of each of plates composing the flow channel structure. It should be noted that in the present preferred embodiment, the thickness direction extends along the axial direction and is therefore defined as identical to the axial direction.

[Entire Configuration of Torque Converter]

The torque converter (100) is a device for transmitting a torque from an engine-side crankshaft (not shown in the drawings) to an input shaft 101 of the transmission. As shown in FIG. 1, the torque converter 100 includes a front cover 11, a torque converter body 12, and the lock-up device (10).

The front cover 11 is fixed to an input-side member. The front cover 11 is a substantially disc-shaped member and includes an outer tubular portion 111, protruding toward the transmission, in the outer peripheral part thereof.

The torque converter body 12 is composed of three types of bladed wheels (an impeller 13, a turbine 14, and a stator 15).

The impeller 13 includes an impeller shell 131, a plurality of impeller blades 132, and an impeller hub 133. The impeller shell 131 is fixed to the outer tubular portion 111 of the front cover 11 by welding or so forth. The impeller blades 132 are fixed to the inner surface of the impeller shell 131. The impeller hub 133 is fixed to the inner peripheral end of the impeller shell 131.

The turbine 14 is disposed in opposition to the impeller 13 within a fluid chamber. The turbine 14 includes a turbine shell 141, a plurality of turbine blades 142, and a turbine hub 143. The turbine blades 142 are fixed to the inner surface of the turbine shell 141. The turbine hub 143 is fixed to the inner peripheral end of the turbine shell 141.

The turbine hub 143 includes a flange portion 143a extending radially outward. The flange portion 143a receives the inner peripheral end of the turbine shell 141 fixed thereto by a plurality of rivets (not shown in the drawings), welding, or so forth. The turbine hub 143 is provided with a spline hole that the input shaft 101 of the transmission is engaged.

The turbine hub 143 includes a plurality of sixth through holes 143b. The sixth through holes 143b axially penetrate the flange portion 143a. The sixth through holes 143b are disposed apart from each other at intervals in the circumferential direction.

The stator 15 is disposed between the impeller 13 and the turbine 14 and is configured to regulate the flow of hydraulic oil returning from the turbine 14 to the impeller 13. The stator 15 includes a stator carrier 151 and a plurality of stator blades 152.

The stator carrier 151 is supported by a stationary shaft 105 through a one-way clutch 102. Thrust bearings 103 and 104 are provided axially on both sides of the stator carrier 151. The stator blades 152 are provided on the outer peripheral surface of the stator carrier 151.

[Lock-Up Device]

Figure 2:
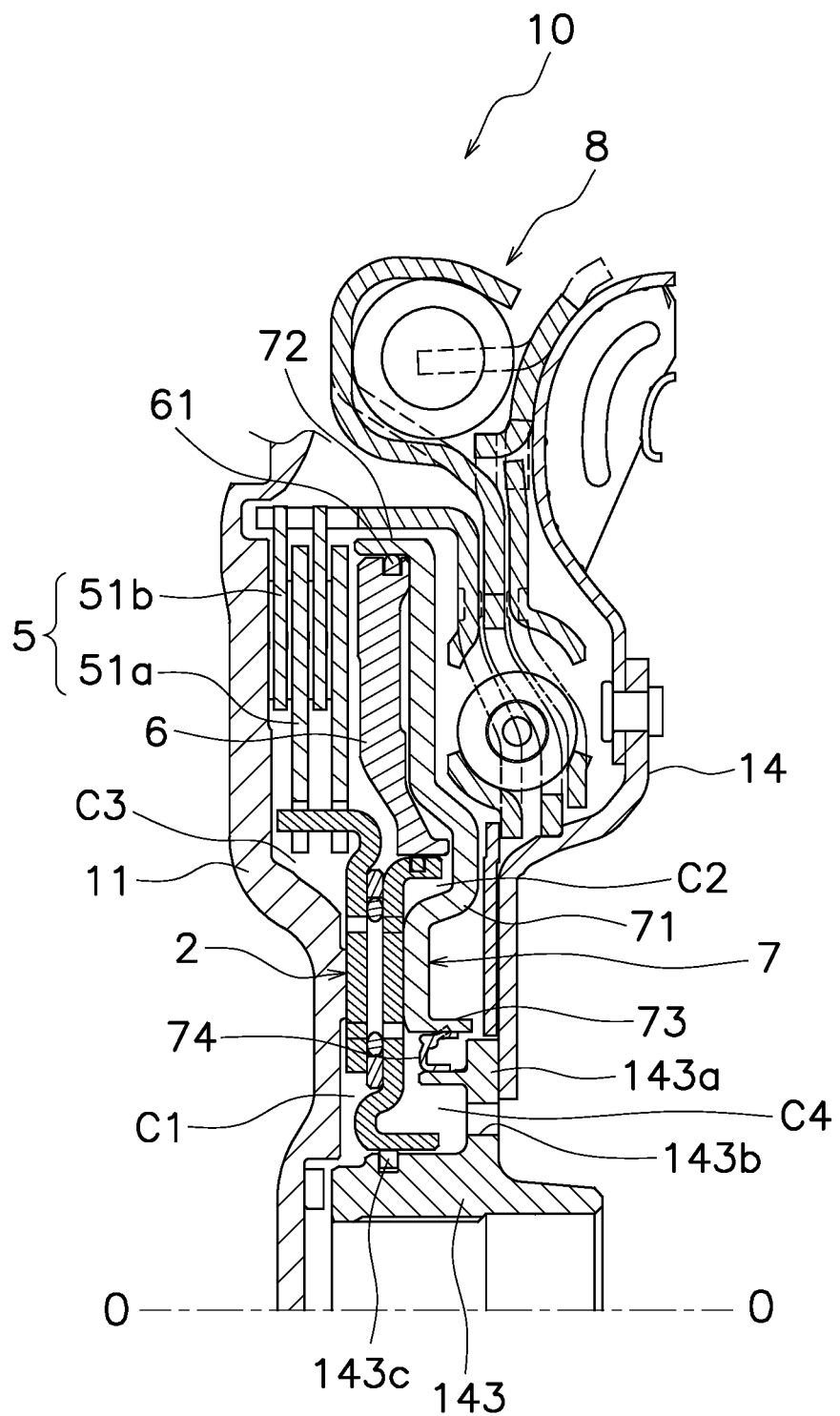
FIG. 2 is a cross-sectional view of a lock-up device.

As shown in FIG. 2, the lock-up device 10 is disposed axially between the front cover 11 and the turbine 14. The lock-up device 10 includes the flow channel structure (2), a clutch part 5, a piston 6, a chamber plate 7, and a damper part 8.

Besides, the lock-up device 10 includes a first fluid chamber C1, a second fluid chamber C2, a third fluid chamber C3, and a fourth fluid chamber C4.

<Flow Channel Structure>

Figure 3:
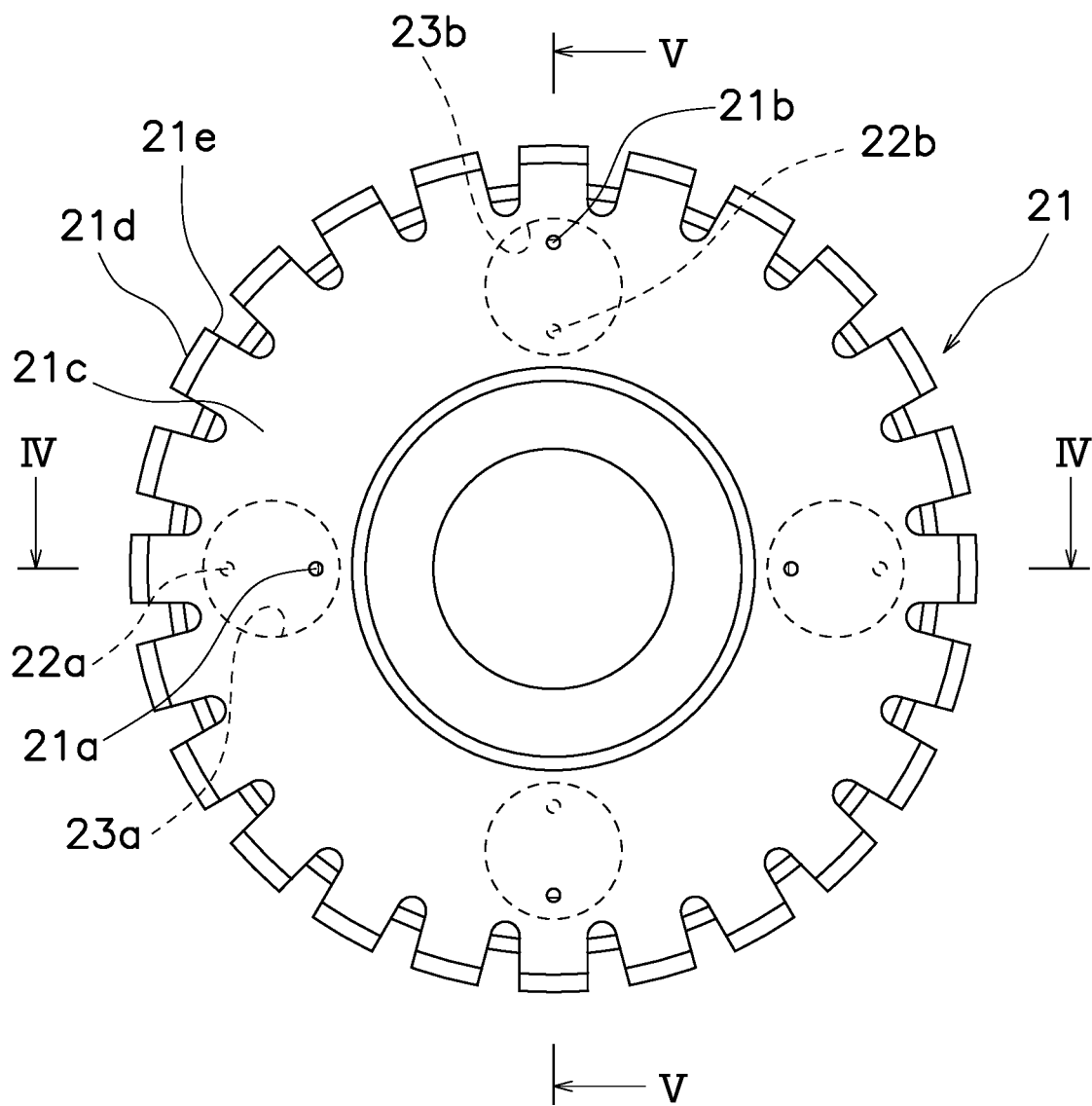
FIG. 3 is a front view of a flow channel structure.
Figure 4:
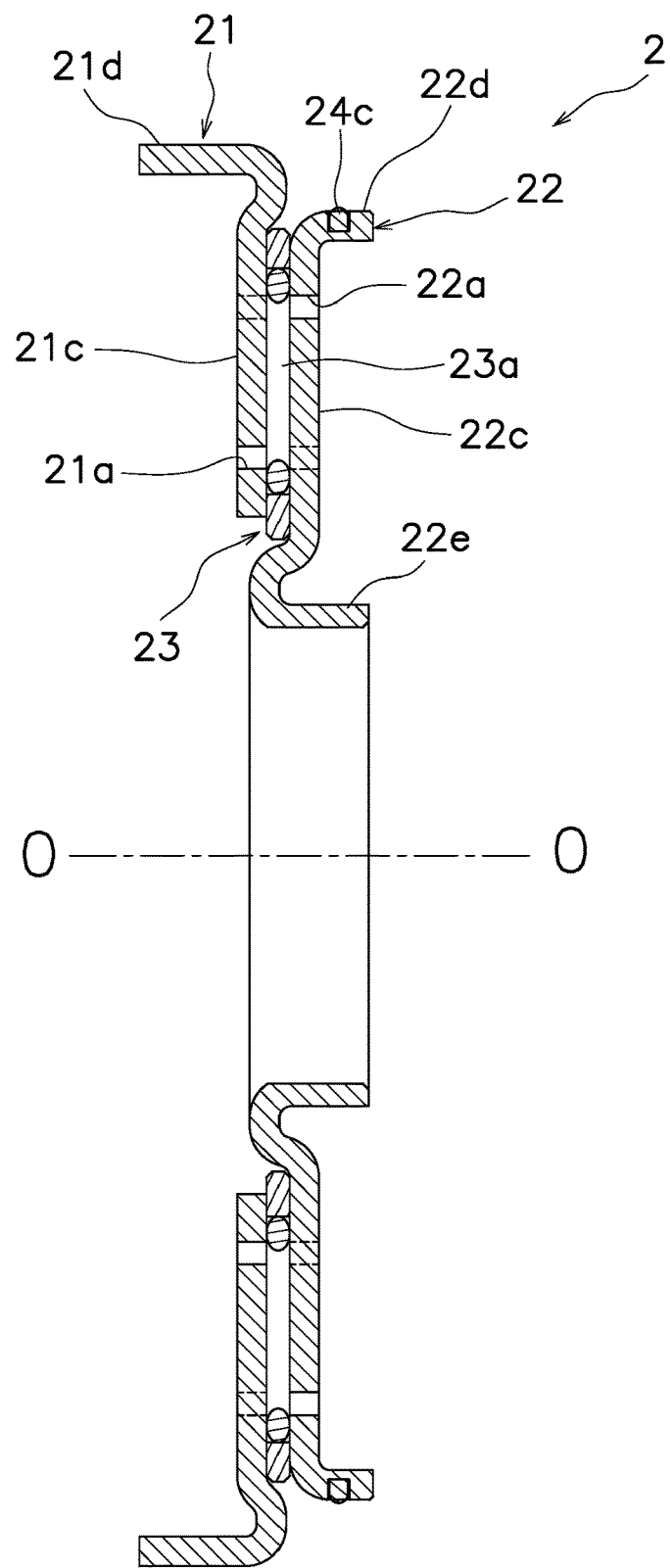
FIG. 4 is a cross-sectional view taken along line IV-IV in FIG. 3.
Figure 5:
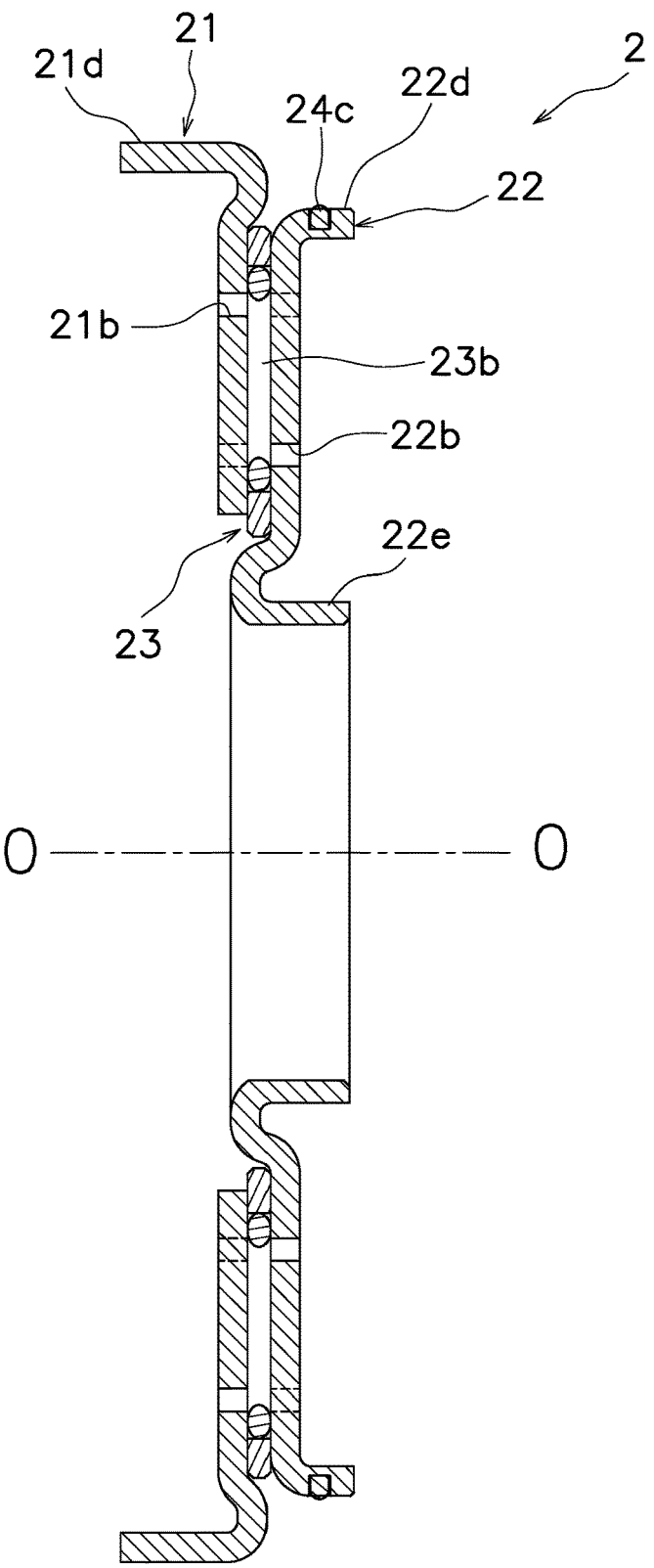
FIG. 5 is a cross-sectional view taken along line V-V in FIG. 3.

FIG. 3 is a front view of the flow channel structure 2; FIG. 4 is a cross-sectional view taken along line IV-IV in FIG. 3; FIG. 5 is a cross-sectional view taken along line V-V in FIG. 3.

As shown in FIGS. 3 to 5, the flow channel structure 2 forms a first flow channel for making the first and second fluid chambers C1 and C2 communicate with each other therethrough. Besides, the flow channel structure 2 also forms a second flow channel for making the third and fourth fluid chambers C3 and C4 communicate with each other therethrough.

The flow channel structure 2 is disposed radially between the turbine hub 143 and both the clutch part 5 and the piston 6. The flow channel structure 2 includes a first plate 21, a second plate 22, and a third plate 23. The first and second plates 21 and 22 are fixed to the third plate 23. The first, second, and third plates 21, 22, and 23 are unitarily rotated with each other.

The flow channel structure 2 is disposed in a rotatable manner. The flow channel structure 2 is fixed to the front cover 11 and is unitarily rotated therewith. Besides, the flow channel structure 2 is immovable in the axial direction.

The inner peripheral surface of the flow channel structure 2 is in contact with the outer peripheral surface of the turbine hub 143. It should be noted that a fourth seal member 143c is disposed between the flow channel structure 2 and the turbine hub 143. The fourth seal member 143c is disposed in a groove circumferentially extending on the outer peripheral surface of the turbine hub 143. The flow channel structure 2 is rotatable relative to the turbine hub 143.

The first plate 21 has an annular shape. The first plate 21 is fixed to the front cover 11. In other words, the first plate 21 is unitarily rotated with the front cover 11. The first plate 21 includes a plurality of first through holes 21a and a plurality of third through holes 21b. It should be noted that in the present preferred embodiment, the first plate 21 includes a pair of first through holes 21a and a pair of third through holes 21b.

The pair of first through holes 21a is disposed on the opposite sides from each other about the rotational axis O. Likewise, the pair of third through holes 21b is disposed on the opposite sides from each other about the rotational axis O. The first through holes 21a are disposed radially inside the third through holes 21b. The first through holes 21a and the third through holes 21b are disposed at a phase difference of 90 degrees in the circumferential direction.

The first through holes 21a penetrate the first plate 21 in the thickness direction. The first through holes 21a open to the first fluid chamber C1.

The third through holes 21b penetrate the first plate 21 in the thickness direction. The third through holes 21b open to the third fluid chamber C3.

The first plate 21 includes a first annular portion 21c and a first tubular portion 21d. The first annular portion 21c and the first tubular portion 21d compose a single plate.

The first through holes 21a and the third through holes 21b are provided in the first annular portion 21c. The first tubular portion 21d axially extends from the outer peripheral end of the first annular portion 21c. When described in detail, the first tubular portion 21d extends from the first annular portion 21c toward the front cover 11. It should be noted that the first tubular portion 21d is formed by axially bending the outer peripheral part of the first plate 21 by stamping or so forth.

The first tubular portion 21d includes a plurality of grooves 21e. The grooves 21e extend in the axial direction. The grooves 21e are disposed apart from each other at intervals in the circumferential direction.

The second plate 22 has an annular shape. The second plate 22 includes a plurality of second through holes 22a and a plurality of fourth through holes 22b. It should be noted that in the present preferred embodiment, the second plate 22 includes a pair of second through holes 22a and a pair of fourth through holes 22b. In the present preferred embodiment, the second through holes 22a are equal in number to the first through holes 21a. Likewise, the fourth through holes 22b are equal in number to the third through holes 21b.

The pair of second through holes 22a is disposed on the opposite sides from each other about the rotational axis O. Likewise, the pair of fourth through holes 22b is disposed on the opposite sides from each other about the rotational axis O. The second through holes 22a and the fourth through holes 22b are disposed at a phase difference of 90 degrees in the circumferential direction. The second through holes 22a are disposed radially outside the fourth through holes 22b.

The second through holes 22a are identical in circumferential position to the first through holes 21a. The first through holes 21a are disposed radially inside the second through holes 22a. The first through holes 21a and the second through holes 22a are different in position from each other as seen in the thickness direction. In other words, the first through holes 21a and the second through holes 22a do not overlap as seen in the thickness direction.

The fourth through holes 22b are identical in circumferential position to the third through holes 21b. The third through holes 21b are disposed radially outside the fourth through holes 22b. The third through holes 21b and the fourth through holes 22b are different in position from each other as seen in the thickness direction. In other words, the third through holes 21b and the fourth through holes 22b do not overlap as seen in the thickness direction.

The second through holes 22a penetrate the second plate 22 in the thickness direction. The second through holes 22a open to the second fluid chamber C2.

The fourth through holes 22b penetrate the second plate 22 in the thickness direction. The fourth through holes 22b open to the fourth fluid chamber C4.

The second plate 22 includes a second annular portion 22c, a second tubular portion 22d, and a third tubular portion 22e. The second annular portion 22c, the second tubular portion 22d, and the third tubular portion 22e compose a single plate.

The second through holes 22a and the fourth through holes 22b are provided in the second annular portion 22c. The second tubular portion 22d axially extends from the outer peripheral end of the second annular portion 22c. When described in detail, the second tubular portion 22d extends from the second annular portion 22c toward the turbine 14.

The third tubular portion 22e axially extends from the inner peripheral end of the second annular portion 22c. When described in detail, the third tubular portion 22e extends from the second annular portion 22c toward the turbine 14. It should be noted that the second tubular portion 22d and the third tubular portion 22e are formed by axially bending the outer peripheral part and the inner peripheral part of the second plate 22 by stamping or so forth.

The third plate 23 has an annular shape. The third plate 23 is disposed between the first plate 21 and the second plate 22. The first plate 21, the third plate 23, and the second plate 22 are laminated in this order in the axial direction.

The third plate 23 includes a plurality of first connecting through holes 23a and a plurality of second connecting through holes 23b. It should be noted that in the present preferred embodiment, the third plate 23 includes a pair of first connecting through holes 23a and a pair of second connecting through holes 23b. In the present preferred embodiment, the first connecting through holes 23a are equal in number to the first through holes 21a. Likewise, the second connecting through holes 23b are equal in number to the third through holes 21b.

The pair of first connecting through holes 23a is disposed on the opposite sides from each other about the rotational axis O. Likewise, the pair of second connecting through holes 23b is disposed on the opposite sides from each other about the rotational axis O. The first connecting through holes 23a and the second connecting through holes 23b are disposed at a phase difference of 90 degrees in the circumferential direction. The first connecting through holes 23a are approximately identical in radial position to the second connecting through holes 23b.

The first connecting through holes 23a penetrate the third plate 23 in the thickness direction. Each first connecting through hole 23a is larger in flow channel area than each first through hole 21a and each second through hole 22a. Each first connecting through hole 23a communicates with each first through hole 21a and each second through hole 22a. In other words, each first through hole 21a and each second through hole 22a overlap each first connecting through hole 23a as seen in the thickness direction.

Each first through hole 21a and each second through hole 22a communicate with each other through each first connecting through hole 23a. In other words, each first through hole 21a, each first connecting through hole 23a, and each second through hole 22a compose the first flow channel for making the first and second fluid chambers C1 and C2 communicate with each other therethrough.

The second connecting through holes 23b penetrate the third plate 23 in the thickness direction. Each second connecting through hole 23b is larger in flow channel area than each third through hole 21b and each fourth through hole 22b. Each second connecting through hole 23b communicates with each third through hole 21b and each fourth through hole 22b. In other words, each third through hole 21b and each fourth through hole 22b overlap each second connecting through hole 23b as seen in the thickness direction.

Each third through hole 21b and each fourth through hole 22b communicate with each other through each second connecting through hole 23b. In other words, each third through hole 21b, each second connecting through hole 23b, and each fourth through hole 22b compose the second flow channel for making the third and fourth fluid chambers C3 and C4 communicate with each other therethrough.

Figure 6:
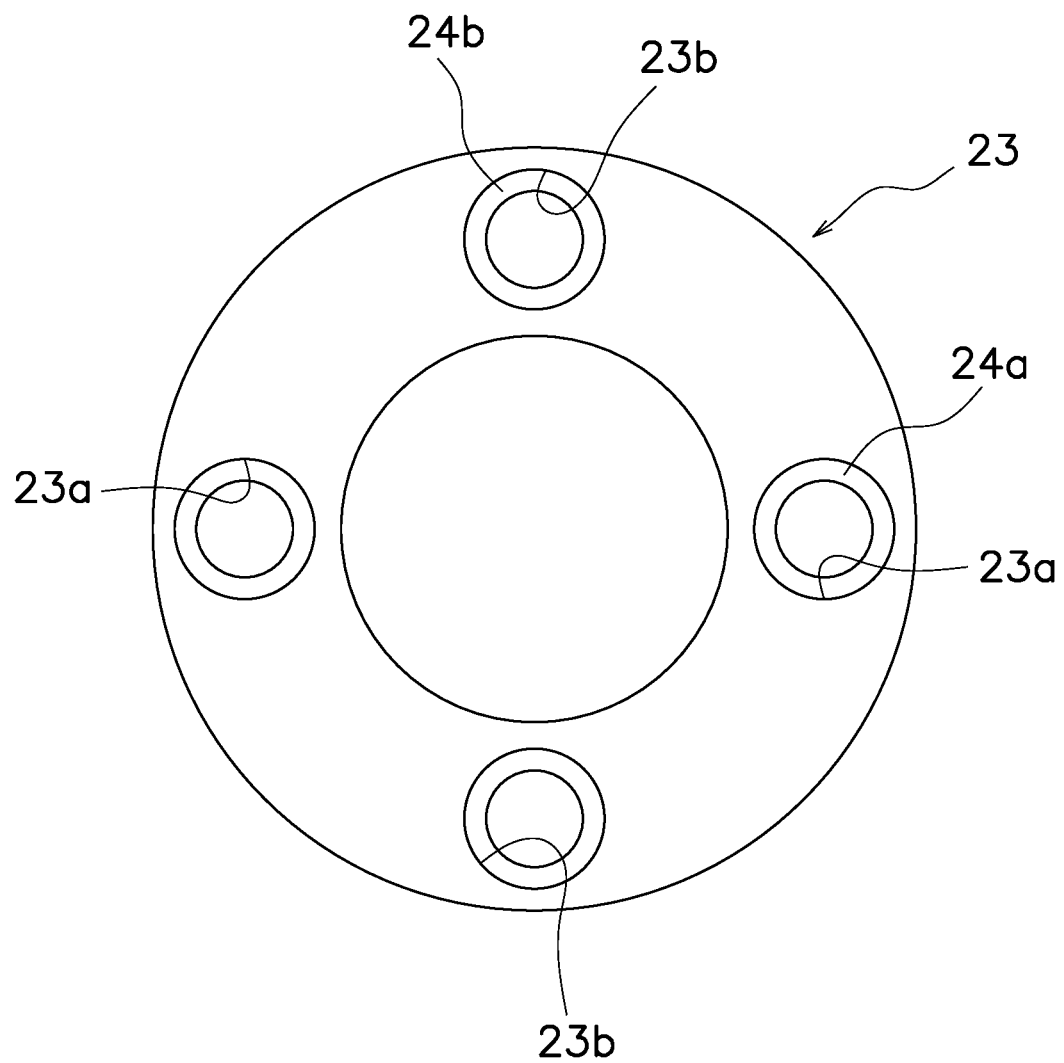
FIG. 6 is a front view of a third plate.

As shown in FIG. 6, the flow channel structure 2 includes a plurality of first seal members 24a and a plurality of second seal members 24b. In the present preferred embodiment, the flow channel structure 2 includes a pair of first seal members 24a and a pair of second seal members 24b.

Each first seal member 24a is disposed along an inner wall surface defining each first connecting through hole 23a. Each second seal member 24b is disposed along an inner wall surface defining each second connecting through hole 23b. The first and second seal members 24a and 24b are, for instance, O-rings. The first and second seal members 24a and 24b are axially interposed between the first and second plates 21 and 22.

As shown in FIGS. 4 and 5, the flow channel structure 2 includes a third seal member 24c. The third seal member 24c extends along the outer peripheral surface of the second plate 22 in the circumferential direction. When described in detail, the second plate 22 is provided with a groove extending along the outer peripheral surface of the second tubular portion 22d in the circumferential direction; the third seal member 24c is disposed in the groove.

<Clutch Part>

As shown in FIGS. 1 and 2, the clutch part 5 is a multi-plate clutch. The clutch part 5 is disposed axially between the front cover 11 and the piston 6. The clutch part 5 includes a plurality of clutch plates 51a and 51b.

The plural clutch plates 51a and 51b are disposed axially between the front cover 11 and the piston 6. The plural clutch plates 51a and 51b are composed of a plurality of first clutch plates 51a and a plurality of second clutch plates 51b. It should be noted that in the present preferred embodiment, the plural clutch plates 51a and 51b are composed of two first clutch plates 51a and two second clutch plates 51b.

Each of the first and second clutch plates 51a and 51b has an annular shape. The first clutch plates 51a and the second clutch plates 51b are alternately disposed in the axial direction. Each first clutch plate 51a is provided with a plurality of teeth on the inner peripheral part thereof. The teeth of the first clutch plates 51a are disposed in the grooves 21e of the first plate 21, respectively. Because of this, the first clutch plates 51a are unitarily rotated with the flow channel structure 2 and the front cover 11.

Each of the first and second clutch plates 51a and 51b is provided with a friction facing fixed to either of the faces thereof. Each second clutch plate 51b is provided with a plurality of teeth on the outer peripheral part thereof.

<Piston>

The piston 6 has an annular shape. The piston 6 is disposed to be axially movable on the outer peripheral surface of the flow channel structure 2. When described in detail, the inner peripheral surface of the piston 6 is in contact with the outer peripheral surface of the second tubular portion 22d of the second plate 22. A gap between the inner peripheral surface of the piston 6 and the outer peripheral surface of the flow channel structure 2 is sealed by the third seal member 24c.

The piston 6 is disposed axially between the clutch part 5 and the chamber plate 7. When the piston 6 is moved toward the clutch part 5, the clutch part 5 is interposed between the piston 6 and the front cover 11; accordingly, the clutch part 5 is turned to a torque transmission state.

The piston 6 is provided with a groove extending on the outer peripheral surface thereof in the circumferential direction. Besides, a fifth seal member 61, having an annular shape, is disposed in the groove of the piston 6.

<Chamber Plate>

The chamber plate 7 is disposed axially between the turbine 14 and both the flow channel structure 2 and the piston 6. The chamber plate 7 is axially opposed at the inner peripheral part thereof to the flow channel structure 2, while being axially opposed at the outer peripheral part thereof to the piston 6. The chamber plate 7 is fixed to the flow channel structure 2. The chamber plate 7 is immovable in the axial direction. Besides, the chamber plate 7 is unitarily rotated with the flow channel structure 2.

The chamber plate 7 includes a body 71, a fourth tubular portion 72, and a fifth tubular portion 73. The body 71, the fourth tubular portion 72, and the fifth tubular portion 73 compose a single plate. The body 71 has an annular shape. The fourth tubular portion 72 axially extends from the outer peripheral end of the body 71. When described in detail, the fourth tubular portion 72 extends from the body 71 toward the front cover 11.

The fourth tubular portion 72 is disposed to cover the piston 6 from radially outside. In other words, the outer peripheral surface of the piston 6 is opposed to the inner peripheral surface of the fourth tubular portion 72. A gap between the fourth tubular portion 72 and the piston 6 is sealed by the fifth seal member 61.

The fifth tubular portion 73 axially extends from the inner peripheral end of the body 71. When described in detail, the fifth tubular portion 73 extends from the body 71 toward the turbine 14. A sixth seal member 74 is disposed for sealing between the fifth tubular portion 73 and the turbine hub 143. It should be noted that the fourth and fifth tubular portions 72 and 73 are formed by axially bending the outer peripheral part and the inner peripheral part of the chamber plate 7 by stamping or so forth.

<Fluid Chambers>

The first fluid chamber C1 is defined by the flow channel structure 2, the front cover 11, and the turbine hub 143. The first fluid chamber C1 communicates with the first through holes 21a of the flow channel structure 2.

The first fluid chamber C1 communicates with a flow channel axially extending in the interior of the input shaft 101. The hydraulic oil flows into the first fluid chamber C1 through the flow channel in the input shaft 10.

The second fluid chamber C2 is defined by the piston 6, the chamber plate 7, and the flow channel structure 2. The second fluid chamber C2 communicates with the second through holes 22a of the flow channel structure 2. The second fluid chamber C2 does not overlap the first fluid chamber C1 as seen in the thickness direction (axial direction).

The second fluid chamber C2 is sealed. Because of this, when the hydraulic oil is supplied to the interior of the second fluid chamber C2, the piston 6 is moved toward the clutch part 5.

The third fluid chamber C3 is defined by the flow channel structure 2, the front cover 11, and the piston 6. The third fluid chamber C3 communicates with the third through holes 21b of the flow channel structure 2. The third fluid chamber C3 accommodates the clutch part 5 in the interior thereof. The third fluid chamber C3 communicates with a torus of the torque converter body 12.

The fourth fluid chamber C4 is defined by the turbine hub 143, the flow channel structure 2, and the chamber plate 7. The fourth fluid chamber C4 communicates with the fourth through holes 22b of the flow channel structure 2. Besides, the fourth fluid chamber C4 communicates with a flow channel produced between the stationary shaft 105 and the input shaft 101 through the sixth through holes 143b provided in the turbine hub 143.

When the lock-up device 10 is actuated, the hydraulic oil is supplied to the first fluid chamber C1 through the flow channel in the input shaft 101. The hydraulic oil, supplied to the first fluid chamber C1, flows to the second fluid chamber C2 through the first flow channel in the flow channel structure 2. When described in detail, the hydraulic oil flows from the first fluid chamber C1 to the second fluid chamber C2 through the first through holes 21a, the first connecting through holes 23a, and the second through holes 22a.

When the hydraulic oil is supplied to the second fluid chamber C2, the second fluid chamber C2 is increased in hydraulic pressure, whereby the piston 6 is moved toward the clutch part 5; consequently, the clutch part 5 is turned to the torque transmission state.

On the other hand, the hydraulic oil, supplied to the fourth fluid chamber C4, flows to the third fluid chamber C3 through the second flow channel in the flow channel structure 2. When described in detail, the hydraulic oil flows from the fourth fluid chamber C4 to the third fluid chamber C3 through the fourth through holes 22b, the second connecting through holes 23b, and the third through holes 21b.

When the hydraulic oil is supplied to the third fluid chamber C3, the clutch part 5 inside the third fluid chamber C3 can be cooled. It should be noted that the hydraulic oil flows from the third fluid chamber C3 to the interior of the torus of the torque converter body 12.

When the torque transmission state of the clutch part 5 is released, the first fluid chamber C1 is connected to a drain circuit. Accordingly, the hydraulic oil inside the second fluid chamber C2 is discharged to the first fluid chamber C1 through the first flow channel in the flow channel structure 2, whereby the second fluid chamber C2 is reduced in hydraulic pressure. As a result, the clutch part 5 is released from being pressed by the piston 6, whereby the torque transmission state of the clutch part 5 is released.

<Damper Part>

Figure 7:
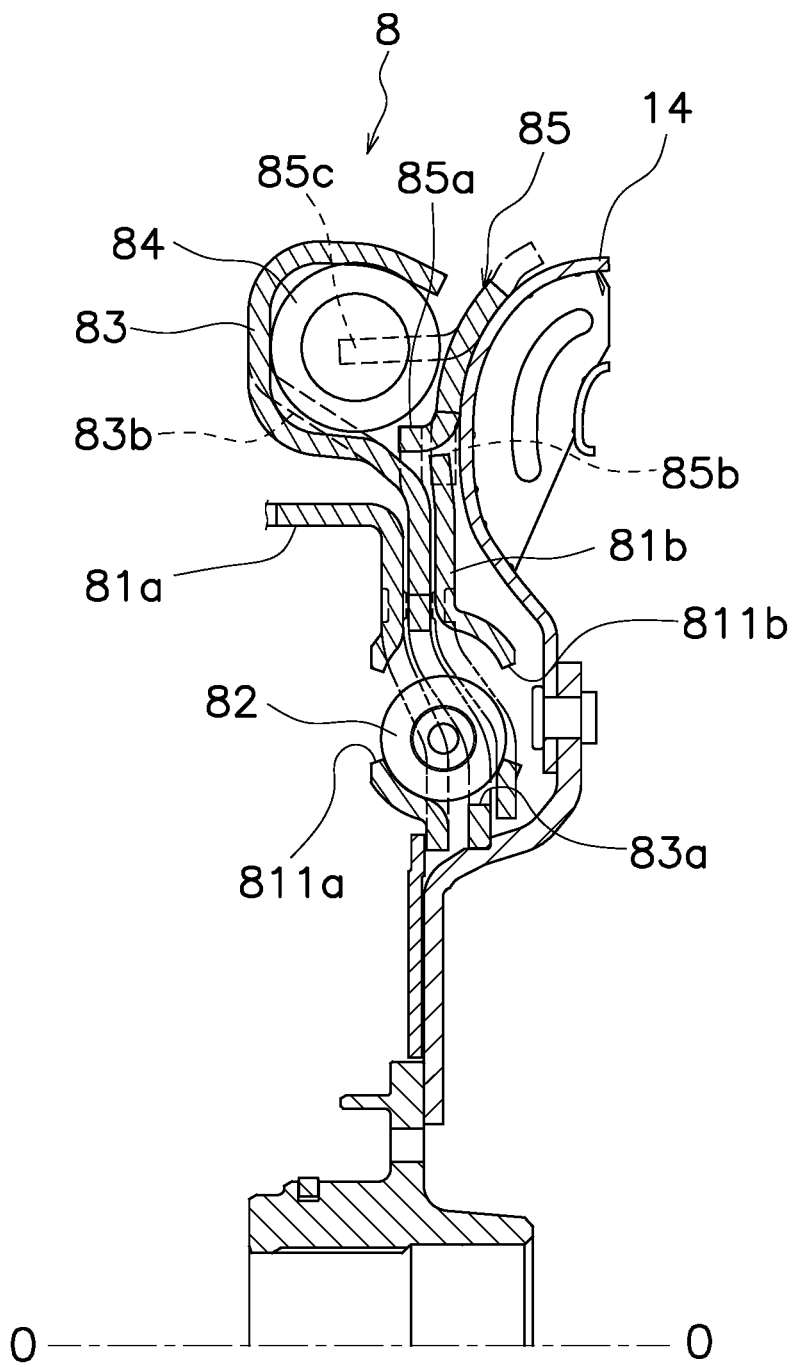
FIG. 7 is a cross-sectional view of a damper part.

FIG. 7 is a cross-sectional view of the damper part 8. As shown in FIG. 7, the damper part 8 attenuates vibration to be inputted thereto through the front cover 11. The damper part 8 includes a first input plate 81a, a second input plate 81b, a plurality of inner torsion springs 82, an intermediate plate 83, a plurality of outer torsion springs 84, and a driven plate 85.

The first input plate 81a is fixed to the second input plate 81b by at least one rivet or so forth, whereby the first and second input plates 81a and 81b are unitarily rotated with each other. The first input plate 81a is disposed on the engine side of the second input plate 81b.

The first input plate 81a is engaged with the second clutch plates 51b and is unitarily rotated therewith. When described in detail, the first input plate 81a includes a plurality of grooves extending in the axial direction. The grooves are disposed apart from each other at predetermined intervals in the circumferential direction. The teeth provided on the outer peripheral part of each second clutch plate 51b are engaged with the grooves. Therefore, the second clutch plates 51b and the first and second input plates 81a and 81b are non-rotatable relative to each other but are axially movable relative to each other.

The first input plate 81a includes a plurality of first window portions 811a disposed apart from each other at intervals in the circumferential direction. The inner torsion springs 82 are disposed in the first window portions 811a, respectively. Besides, a pair of walls of each first window portion 811a of the first input plate 81a is engaged with both ends of each inner torsion spring 82.

The second input plate 81b includes a plurality of second window portions 811b disposed apart from each other at intervals in the circumferential direction. The inner torsion springs 82 are disposed in the second window portions 811b, respectively. Besides, a pair of walls of each second window portion 811b is engaged with both ends of each inner torsion spring 82.

The plural inner torsion springs 82 are disposed in alignment in the circumferential direction. The inner torsion springs 82 are disposed in the first and second window portions 811a and 811b of the first and second input plates 81a and 81b and third window portions 83a of the intermediate plate 83 (to be described).

The intermediate plate 83 is disposed axially between the first and second input plates 81a and 81b. The intermediate plate 83 is rotatable relative to the driven plate 85 and the first and second input plates 81a and 81b. The intermediate plate 83 is a member for making the inner torsion springs 82 and the outer torsion springs 84 act in series.

The outer peripheral part of the intermediate plate 83 has a substantially tubular shape and is opened toward the turbine 14. The outer peripheral part of the intermediate plate 83 holds the outer torsion springs 84. Besides, the driven plate 85 extends through the opening of the outer peripheral part of the intermediate plate 83.

The intermediate plate 83 includes the plural third window portions 83a. The plural third window portions 83a are provided in the inner peripheral part of the intermediate plate 83. The plural third window portions 83a are disposed apart from each other at intervals in the circumferential direction. The third window portions 83a are disposed in axial opposition to the first window portions 811a and the second window portions 811b, respectively. The inner torsion springs 82 are disposed in the third window portions 83a, respectively. Besides, a pair of walls, circumferentially opposed to each other in each third window portion 83a, is engaged with both ends of each inner torsion spring 82.

The intermediate plate 83 includes a plurality of first engaging portions 83b. The first engaging portions 83b are provided in the outer peripheral part of the intermediate plate 83 so as to be disposed apart from each other at intervals in the circumferential direction. The first engaging portions 83b are engaged with the outer torsion springs 84. When described in detail, each outer torsion spring 84 is disposed between adjacent two of the first engaging portions 83b.

The outer torsion springs 84 are disposed in alignment in the circumferential direction. Besides, the outer torsion springs 84 are disposed radially outside the clutch part 5.

The outer torsion springs 84 are held by the outer peripheral part of the intermediate plate 83. The outer torsion springs 84 act in series with the inner torsion springs 82 through the intermediate plate 83.

The driven plate 85 is an annular disc member that is fixed to the turbine shell 141. Besides, the driven plate 85 is rotatable relative to the intermediate plate 83.

The driven plate 85 includes at least one first stopper pawl 85a, at least one second stopper pawl 85b, and a plurality of second engaging portions 85c.

The at least one first stopper pawl 85a is inserted into at least one cutout of the intermediate plate 83. Accordingly, the intermediate plate 83 is restricted from rotating relative to the driven plate 85 at a predetermined angle or greater. The at least one second stopper pawl 85b is inserted into at least one cutout of the second input plate 81b. Accordingly, the first and second input plates 81a and 81b are restricted from rotating relative to the driven plate 85 at a predetermined angle or greater.

The second engaging portions 85c are engaged with the outer torsion springs 84. The plural second engaging portions 85c are disposed apart from each other at predetermined intervals in the circumferential direction. Each outer torsion spring 84 is disposed between each circumferentially adjacent pair of second engaging portions 85c. The circumferentially adjacent pair of second engaging portions 85c is engaged with both ends of each outer torsion spring 84.

[Action]

First, an action of the torque converter body 12 will be explained. During rotation of the front cover 11 and the impeller 13, the hydraulic oil flows from the impeller 13 to the turbine 14 and further flows to the impeller 13 through the stator 15. Accordingly, a torque is transmitted from the impeller 13 to the turbine 14 through the hydraulic oil. The torque transmitted to the turbine 14 is then transmitted to the input shaft 101 of the transmission through the turbine hub 143.

It should be noted that during running of the engine, the hydraulic oil constantly flows into the fourth fluid chamber C4 through the sixth through holes 143b the turbine hub 143 and further flows into the third fluid chamber C3 through the second flow channel in the flow channel structure 2 so as to be supplied to the clutch part 5 and the impeller 3.

When the speed ratio of the torque converter 100 increases and the rotation of the input shaft 101 reaches a predetermined speed, the hydraulic oil is supplied to the first fluid chamber C1 and is further supplied to the second fluid chamber C2 through the first flow channel in the flow channel structure 2. The hydraulic oil in the second fluid chamber C2 becomes greater in pressure than that to be supplied to the third fluid chamber C3. Accordingly, the piston 6 is moved toward the front cover 11. As a result, the piston 6 presses the first and second clutch plates 51a and 51b toward the front cover 11, whereby a lock-up state is turned on (a clutch-on state is made).

In the clutch-on state described above, a torque is transmitted from the front cover 11 to the turbine hub 143 through the lock-up device 10. Specifically, the torque inputted to the front cover 11 is transmitted through a path of "the clutch part 5→the first and second input plates 81a and 81b →the inner torsion springs 82→the intermediate plate 83→the outer torsion springs 84→the driven plate 85" and is then outputted to the turbine hub 143.

Here, the lock-up device 10, for which the clutch-on state is made, transmits a torque as described above, and simultaneously, attenuates fluctuations of a torque inputted thereto through the front cover 11. Specifically, when torsional vibrations occur in the lock-up device 10, the inner torsion springs 82 and the outer torsion springs 84 are compressed in series between the first and second input plates 81a and 81b and the driven plate 85. Torque fluctuations, occurring with torsional vibrations, are thus attenuated by the actuation of the inner torsion springs 82 and the outer torsion springs 84.

It should be noted that when the lock-up state is turned off (i.e., a clutch-off state is made), the first fluid chamber C1 is connected to the drain circuit. Accordingly, the hydraulic oil in the second fluid chamber C2 is discharged through the first flow channel in the flow channel structure 2 and the first fluid chamber C1. Because of this, the second fluid chamber C2 becomes lower in hydraulic pressure than the third fluid chamber C3, whereby the piston 6 is moved toward the turbine 14. As a result, the piston 6 is released from pressing the clutch part 5. Thus, the clutch-off state is made.

Other Preferred Embodiments

The present invention is not limited to the preferred embodiment described above, and as described below, a variety of changes or modifications can be made without departing from the scope of the present invention. It should be noted that modifications to be described are simultaneously applicable.

(a) For example, in the preferred embodiment described above, the first plate 21 is provided as a single plate. However, the first plate 21 can be composed of a plurality of plates. In this case, the first and third through holes 21a and 21b penetrate the plural plates. It should be noted that similarly to the first plate 21, each of the second and third plates 22 and 23 can be composed of a plurality of plates.

(b) In the preferred embodiment described above, the flow channel structure 2 includes the first and second flow channels. However, the configuration of the flow channel structure 2 is not limited to this. For example, the flow channel structure 2 can include only the first flow channel without including the second flow channel.

In this case, the first plate 21 is not provided with any third through holes 21b; the second plate 22 is not provided with any fourth through holes 22b; the third plate 23 is not provided with any second connecting through holes 23b.

(c) The first and third through holes 21a and 21b, provided in the first plate 21, are not limited in number to those in the preferred embodiment described above. For example, the number of the first through holes 21a and that of the third through holes 21b can set to one, respectively. Likewise, the second and fourth through holes 22a and 22b, provided in the second plate 22, are not limited in number to those in the preferred embodiment described above. Still likewise, the first and second connecting through holes 23a and 23b, provided in the third plate 23, are not limited in number to those in the preferred embodiment described above.

Figure 8:
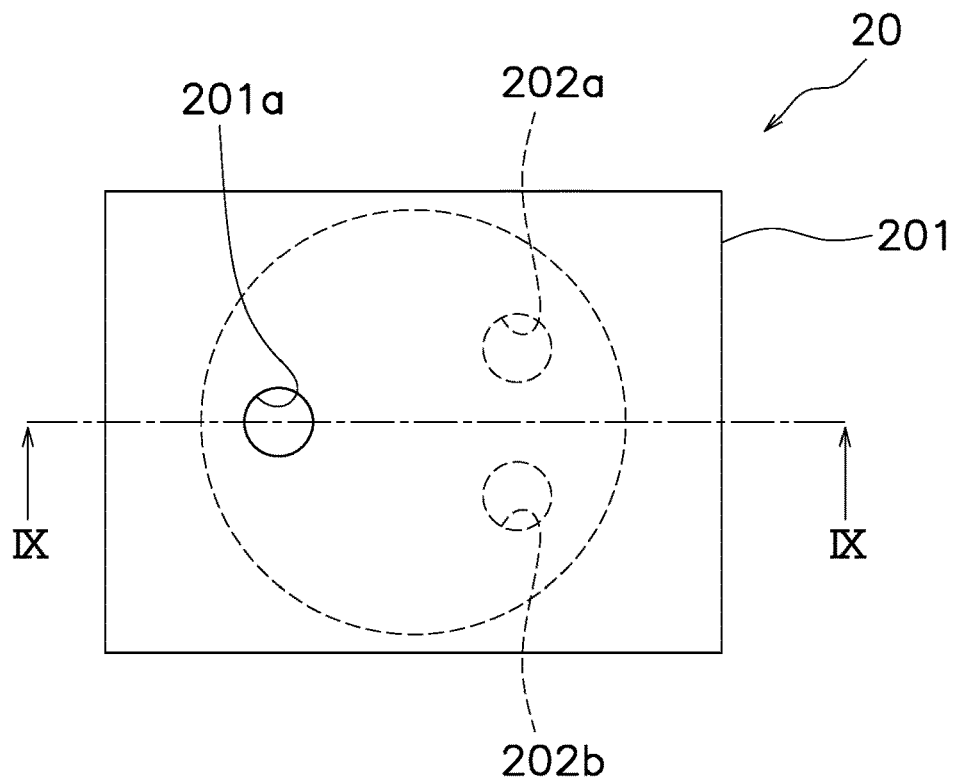
FIG. 8 is a plan view of a flow channel structure according to a modification.
Figure 9:
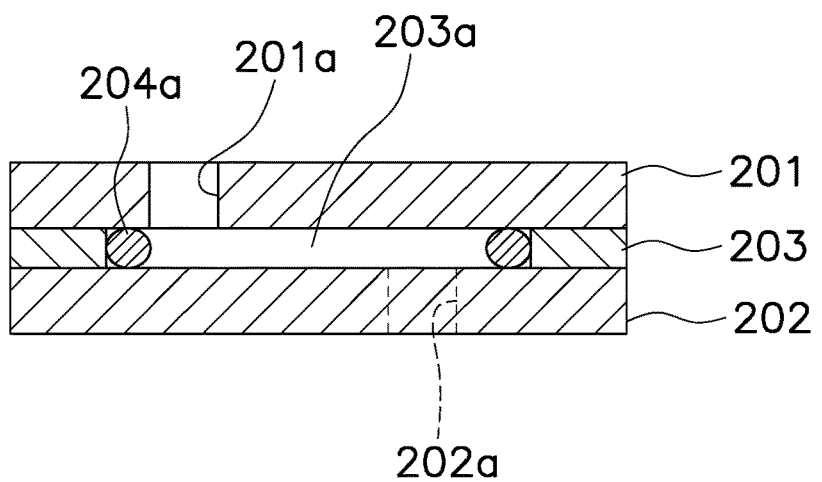
FIG. 9 is a cross-sectional view taken along line IX-IX in FIG. 8.

(d) In the preferred embodiment described above, the flow channel structure is applied to the lock-up device 10 of the torque converter 100. However, the flow channel structure is similarly applicable to another type of device. For example, as shown in FIGS. 8 and 9, a flow channel structure 20 is usable as a manifold block.

The flow channel structure 20 includes a first plate 201, a second plate 202, and a third plate 203. The first plate 201 includes a first through hole 201a. The first through hole 201a opens to the first fluid chamber C1. It should be noted that the first fluid chamber C1 is, for instance, a plumbing pipe.

The second plate 202 includes a second through hole 202a and a fifth through hole 202b. The second through hole 202a opens to the second fluid chamber C2, whereas the fifth through hole 202b opens to a fifth fluid chamber C5. In other words, the second and fifth through holes 202a and 202b open to fluid chambers that are different from each other. It should be noted that the second and fifth fluid chambers C2 and C5 are, for instance, plumbing pipes.

The third plate 203 includes a first connecting through hole 203a. The first connecting through hole 203a communicates with the first, second, and fifth through holes 201a, 202a, and 202b. A first seal member 204a is disposed along the inner wall surface defining the first connecting through hole 203a.

The flow channel structure 20 includes a first flow channel branched into two. When described in detail, the fluid, flowing from the first fluid chamber C1, is supplied to the first connecting through hole 203a through the first through hole 201a. Then, the fluid is supplied from the first connecting through hole 203a through the second through hole 202a to the second fluid chamber C2 and is simultaneously supplied from the first connecting through hole 203a through the fifth through hole 202b to the fifth fluid chamber C5.

It should be noted that the fluid can reversely flow through the first flow channel. Specifically, the fluid is supplied from the second and fifth fluid chambers C2 and C5 through the second and fifth through holes 202a and 202c to the first connecting through hole 203a. Then, the fluid flowing from the second fluid chamber C2 and that flowing from the fifth fluid chamber C5 can be collectively discharged to the first fluid chamber C1 through the first through hole 201a.

In this modification, the second plate 202 includes two through holes composed of the second and fifth through holes 202a and 202c, but alternatively, can include three or more through holes. The three or more through holes are herein opened to fluid chambers that are different from each other. With the configuration, the first flow channel in the flow channel structure 20 can be branched into three or more.

(e) Gaskets can be used instead of the first and second seal members 24a and 24b. When described in detail, gasket seals can be inserted between the first and third plates 21 and 23 and between the second and third plates 22 and 23, respectively.

REFERENCE SIGNS LIST

2: Flow channel structure
21: First plate
21a: First through hole
21b: Third through hole
22: Second plate
22a: Second through hole
22b: Fourth through hole
23: Third plate
23a: First connecting through hole
23b: Second connecting through hole
24a: First seal member
24b: Second seal member
5: Clutch part
6: Piston
7: Chamber plate
10: Lock-up device
11: Front cover
14: Turbine
143: Turbine hub
C1: First fluid chamber
C2: Second fluid chamber
C3: Third fluid chamber
C4: Fourth fluid chamber
C5: Fifth fluid chamber

What is claimed is:

1. A flow channel structure configured to form a first flow channel which makes a first fluid chamber and a second fluid chamber communicate with each other therethrough, the flow channel structure comprising:
a first plate including a first through hole, the first through hole penetrating the first plate in a thickness direction so as to open to the first fluid chamber;
a second plate including a second through hole, the second through hole penetrating the second plate in the thickness direction so as to open to the second fluid chamber; and
a third plate disposed between the first and second plates, the third plate including a first connecting through hole, the first connecting through hole penetrating the third plate in the thickness direction, the first connecting through hole larger in flow channel area than each of the first and second through holes, wherein
the first and second through holes are disposed in different positions from each other as seen in the thickness direction, and
the first connecting through hole communicates with the first and second through holes.

2. The flow channel structure according to claim 1, further comprising:
a first seal member disposed along an inner wall surface defining the first connecting through hole.

3. The flow channel structure according to claim 1, wherein
the flow channel structure is configured to form a second flow channel which makes a third fluid chamber and a fourth fluid chamber communicate with each other therethrough,
the first plate includes a third through hole, the third through hole penetrating the first plate in the thickness direction so as to open to the third fluid chamber,
the second plate includes a fourth through hole, the fourth through hole penetrating the second plate in the thickness direction so as to open to the fourth fluid chamber,
the third plate includes a second connecting through hole, the second connecting through hole penetrating the third plate in the thickness direction,
the third and fourth through holes are disposed in different positions from each other as seen in the thickness direction, and
the second connecting through hole communicates with the third and fourth through holes, the second connecting through hole larger in flow channel area than each of the third and fourth through holes.

4. The flow channel structure according to claim 3, further comprising:
a second seal member disposed along an inner wall surface defining the second connecting through hole.

5. The flow channel structure according to claim 3, wherein the first, second, and third plates are disposed to be unitarily rotated with each other, each of the first, second, and third plates having an annular shape.

6. The flow channel structure according to claim 5, wherein the third through hole is disposed at a position that is radially outside a position of the fourth through hole.

7. A lock-up device of a torque converter configured to transmit a torque inputted thereto from a front cover to a transmission-side member through a turbine hub, the lock-up device comprising:
a clutch part disposed between the front cover and the turbine;
the flow channel structure according to claim 3, the flow channel structure fixed to the front cover;
a piston configured to place the clutch part to in a torque transmission state, the piston disposed to be axially movable on an outer peripheral surface of the flow channel structure; and
a chamber plate fixed to the flow channel structure, the chamber plate disposed between the piston and the turbine,
the first fluid chamber being defined by the flow channel structure, the front cover, and the turbine hub, the first fluid chamber communicating with the first through hole,
the second fluid chamber being defined by the piston, the chamber plate, and the flow channel structure, the second fluid chamber communicating with the second through hole,
the third fluid chamber being defined by the flow channel structure, the front cover, and the piston, the third fluid chamber communicating with the third through hole; and
the fourth fluid chamber being defined by the turbine hub, the flow channel structure, and the chamber plate, the fourth fluid chamber communicating with the fourth through hole.

8. The flow channel structure according to claim 1, wherein the first, second, and third plates are disposed to be unitarily rotated with each other, each of the first, second, and third plates having an annular shape.

9. The flow channel structure according to claim 8, wherein the first through hole is disposed at a position that is radially inside a position of the second through hole.

10. The flow channel structure according to claim 1, wherein
the second plate includes an additional through hole, the additional through hole penetrating the second plate in the thickness direction so as to open to an additional fluid chamber, and
the first connecting through hole communicates with the additional through hole.

11. A lock-up device of a torque converter configured to transmit a torque inputted thereto from a front cover to a transmission-side member through a turbine hub, the lock-up device comprising:
a clutch part disposed between the front cover and the turbine;
the flow channel structure according to claim 1, the flow channel structure fixed to the front cover;
a piston configured to place the clutch part to in a torque transmission state, the piston disposed to be axially movable on an outer peripheral surface of the flow channel structure; and
a chamber plate fixed to the flow channel structure, the chamber plate disposed between the piston and the turbine,
the first fluid chamber being defined by the flow channel structure, the front cover, and the turbine hub, the first fluid chamber communicating with the first through hole, and
the second fluid chamber being defined by the piston, the chamber plate, and the flow channel structure, the second fluid chamber communicating with the second through hole.

* * * * *